United States Patent [19]

Themy

[11] 4,201,651
[45] May 6, 1980

[54] ELECTROLYSIS CELL

[76] Inventor: Constantinos D. Themy, 4984 S. 360 West, Murray, Utah 84106

[21] Appl. No.: 969,845

[22] Filed: Dec. 15, 1978

[51] Int. Cl.² .................. C25B 9/00; C25B 11/02; C25B 15/08
[52] U.S. Cl. .................. 204/217; 204/272; 204/274; 204/275
[58] Field of Search .............. 204/217, 272, 274, 275, 204/149

[56] References Cited

U.S. PATENT DOCUMENTS

| | | | |
|---|---|---|---|
| 2,530,524 | 11/1950 | Hlavin | 204/217 |
| 3,022,232 | 2/1962 | Bailey et al. | 204/217 X |
| 3,853,734 | 12/1974 | Ellis et al. | 204/217 X |
| 3,922,207 | 11/1975 | Lowrey, Jr. et al. | 204/217 X |

Primary Examiner—John H. Mack
Assistant Examiner—D. R. Valentine
Attorney, Agent, or Firm—Phillips, Moore, Weissenberger, Lempio & Majestic

[57] ABSTRACT

Prior art electrolysis cells used for producing chlorine for sanitizing and sterilization purposes deteriorate due to accumulation of scale on the electrodes thereof. This problem is solved by an improved cell comprising an outer electrode having an in-facing surface which falls generally on a first cylindrical surface and an inner generally coaxial electrode having an out-facing surface which falls generally on a second cylindrical surface, the second cylindrical surface falling inward radially of the first cylindrical surface, the outer and inner electrodes being longitudinally coextensive for at least a substantial portion thereof. The inner and outer electrodes are rotated relative to one another. An abrading structure is mounted to one of the electrodes with an abrasive portion thereof in abrasive contact with the other of the electrodes. The abrading structure is electrically insulated from at least one of the electrodes. The electrodes are supported in electrically insulating relation relative to one another within a cell cavity.

7 Claims, 5 Drawing Figures

ELECTROLYSIS CELL

BACKGROUND OF THE INVENTION

1. Field of the Invention

This invention relates to an electrolysis cell useful for generating chlorine, and in some instances ozone, by the electrolysis of a sodium chloride solution. Such an apparatus is particularly useful for the chlorination of swimming pools, drinking water supplies, and the like.

2. Prior Art

The prior art has recognized that scale buildup is a serious problem in electrolysis cells, particularly electrolysis cells used for the production of chlorine from salt water solutions. In one relevant prior art patent, U.S. Pat. No. 3,282,823 issued to John A. Richards on Nov. 1, 1966, a pair of cylindrical electrodes are provided, one without the other, and a jet action is provided within the cell which causes gravel laden water to scour the facing surfaces of the coaxial electrodes. Such structures, however, require means for retaining the gravel in the system as well as requiring utilizing a perforate inner cylindrical electrode thereby reducing the overall effective electrode area. Also, the gravel can cause a direct short between the electrodes thus damaging them. Since complete retention of the gravel in the system is not certain, such gravel can conceivably escape from the cell to a swimming pool or the like where it could clog filters or pumps or simply form an unattractive deposit. Further, because of the escape of gravel, disassembly of the cell to replace lost gravel becomes necessary, thus increasing downtime. Still further, the interior of the cell must be relatively complex in structure to assure the proper flow direction of the gravel suspension. All of this increases the overall complexity and cost of the apparatus while providing additional potential breakdown problems.

It would be highly desirable to provide a flow-through electrolysis cell which did not have the above disadvantages, yet which featured a fully adequate structure for abrasion of either the anode or cathode so as to prevent scale formation. In this respect, it should be mentioned that such scale formation generally does not take place at both the anode and the cathode, but rather only at the cathode whereat calcium and magnesium tend to deposit as hard water scale. Thus, it is only necessary to remove scale from the cathode since the anode will remain generally scale free in any event.

SUMMARY OF THE INVENTION

The present invention is directed to an electrolysis cell which includes an outer electrode having an in-facing surface which falls generally on a first cylindrical surface and an inner generally coaxial electrode which has an out-facing surface which falls generally on a second cylindrical surface, the in-facing and out-facing surfaces being spaced from one another a proper distance for electrolysis and the outer and inner electrodes being longitudinally coextensive for at least a substantial distance. Means are provided for relatively rotating the inner and outer electrodes. An abrading structure having an abrading portion is provided. Means are provided for mounting the abrading structure to a respective one of the electrodes and with the abrasive portion thereof in abrasive contact with a respective other of the electrodes. Means are provided for electrically insulating the abrading surface from at least one of the electrodes and means are provided for supporting the electrodes in electrically insulating relation relative to one another and for defining a cell cavity about the electrodes.

BRIEF DESCRIPTION OF THE DRAWING

The invention will be better understood by reference to the figures of the drawings wherein like numbers denote like parts throughout and wherein.

DETAILED DESCRIPTION OF THE PREFERRED EMBODIMENTS

Figure 1:
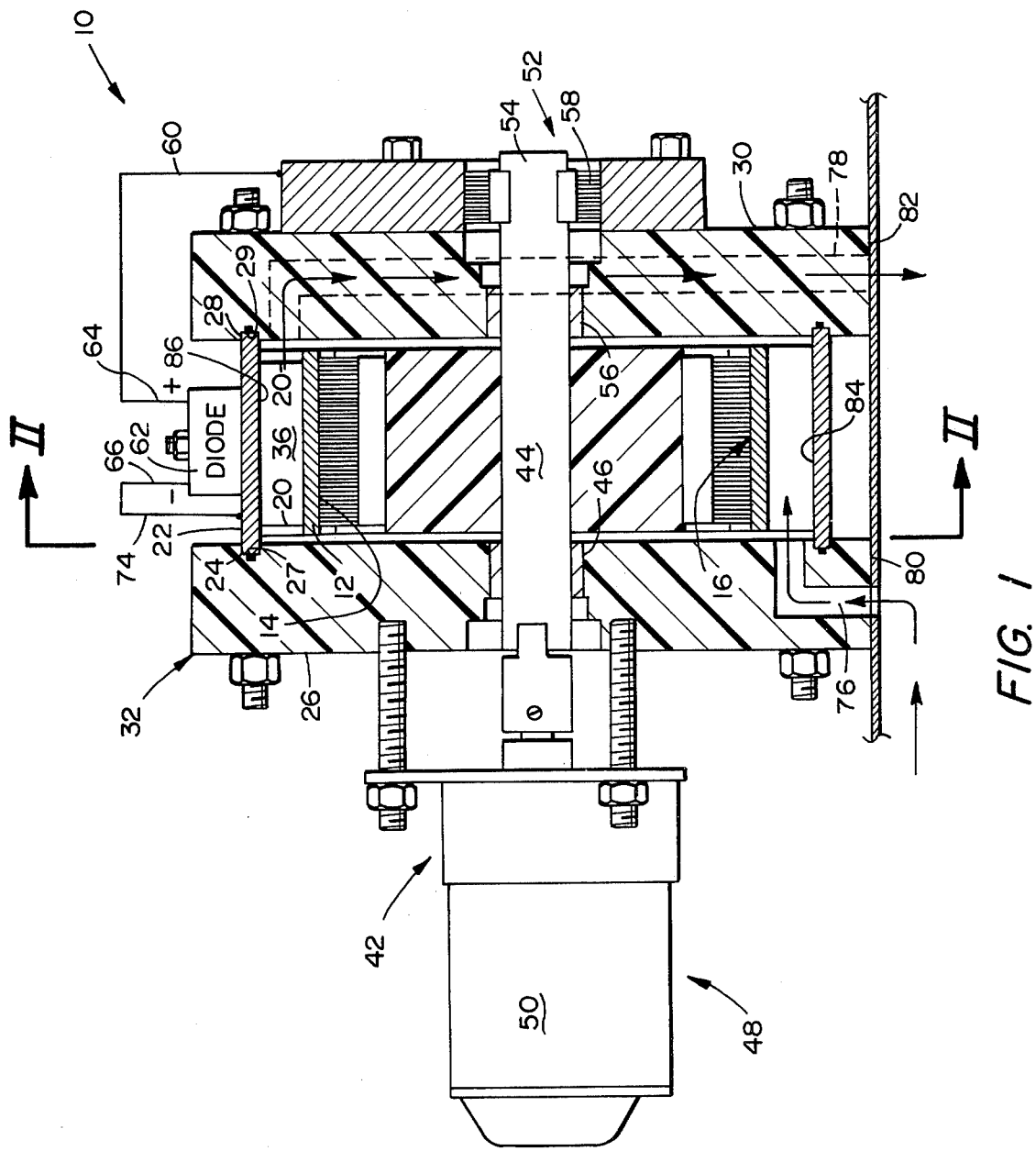
FIG. 1 illustrates, in side, partially sectioned view, a first embodiment in accordance with the present invention.
Figure 2:
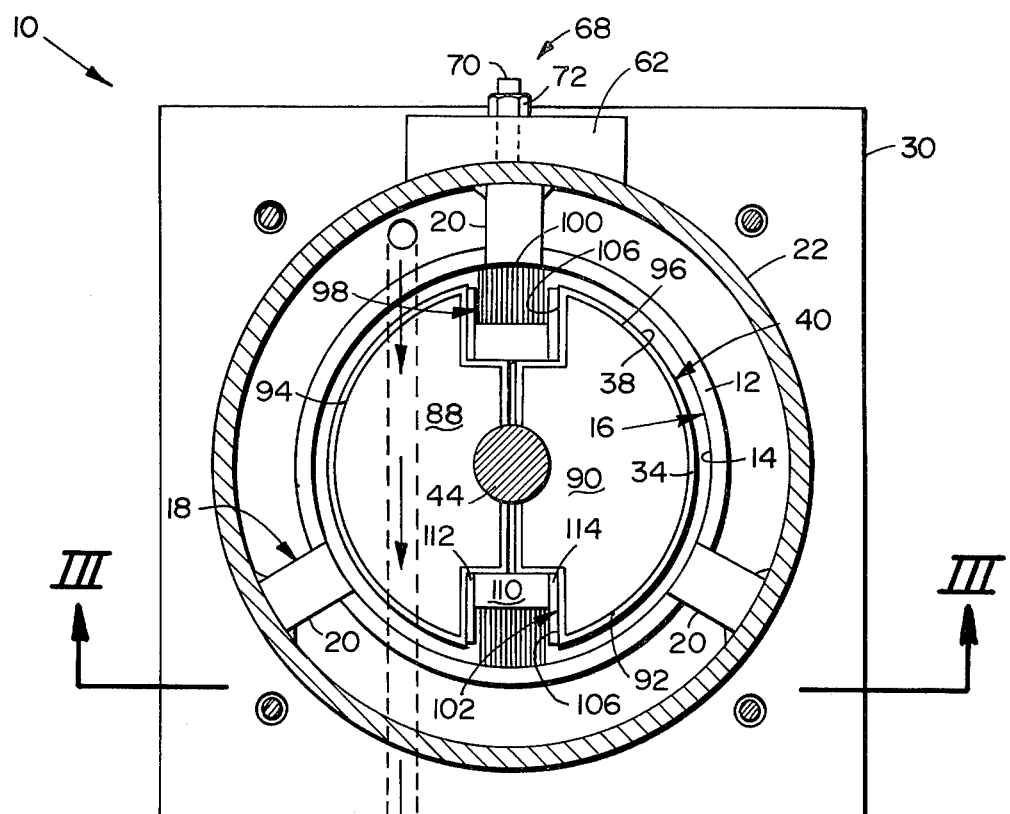
FIG. 2 illustrates a view taken along the line II—II of FIG. 1.

Adverting to FIGS. 1 and 2, there is illustrated therein an electrolysis cell 10 in accordance with one embodiment of the present invention. Briefly, the cell 10 includes an outer electrode 12 having an in-facing surface 14 which falls generally on a first cylindrical surface 16. In the embodiment illustrated, the outer electrode 12 is attached via a support structure 18 (see FIG. 2) in the embodiment illustrated a plurality of bars 20 which extend from a support tube 22 which surrounds the outer electrode 12 into supporting contact therewith. A first end 24 of the support tube 22 is closed by a first end wall 26 and a second end 28 of the support tube 22 is closed by a second end wall 30. An annular channel 27 is formed in the end wall 26 and an annular channel 29 is formed in the end wall 30 with the aforementioned annular channels 27 and 29 respectively serving for accepting the first end 24 and second end 28 of the support tube 22. The respective end walls 26 and 30 are generally made of insulating material whereby the support tube 22 along with the end walls 26 and 30 comprise means 32 for supporting the outer electrode 12 and an inner generally coaxial electrode 34 in electrically insulating relation relative to one another and for defining a cell cavity 36 about the electrodes 12 and 34.

The inner generally coaxial electrode 34 has an out-facing surface 38 which falls generally on a second cylindrical surface 40. The second cylindrical surface 40 lies inwardly radially of the first cylindrical surface 16. The outer and inner electrodes 12 and 34 are longitudinally extensive for at least a substantial portion thereof as will be seen most clearly from FIG. 1.

Means 42 are provided for relatively rotating the inner and outer electrodes 12 and 34. The relatively rotating means 42, in the embodiment illustrated, comprises an electrically conductive shaft 44 which passes through a respective one of the end walls 26 and 30 in fluid sealing rotatable rotation thereto. Bearings 46 help to provide such relation. The shaft 44 is connected to the inner electrode 34 axially thereof and serves to cause rotation thereof. Means 48, in the embodiment illustrated a conventional motor 50, are provided external of the end walls 26 and 30 and serve for motivating the shaft 44 to rotate in a conventional manner. In the particular embodiment illustrated in FIG. 1, the motor 50 is external of the first end wall 26.

Means 52 are provided for conductively connecting the shaft 44 to the out-facing surface 38 of the inner electrode 34. In the particular embodiment illustrated, the conductively connecting means 52 comprises an end 54 of the shaft 44, said end 54 extending past sealing bearings 56 to a position opposite the second end wall 30 and a conventional brush conductor 58 which is communicated via a line 60 to a diode 62 which is conventionally connected to an alternating current power source and which rectifies the alternating current and provides both a positive output 64 and a negative output 66. The bearings 46 and 56 are so located that the shaft 44 and hence the inner electrode 34 are accurately positioned relative to the outer electrode 12 which is itself held in place due to channels 27 and 29 holding the ends 24 and 28 of the support tube 22 in place. Thus, assembly and disassembly with full alignment of the inner electrode 12 relative to the outer electrode 34 is readily obtained with the electrolysis cell 10 of the present invention.

In the preferred embodiment as illustrated, the power source diode 62 is mounted directly to the support tube 22, cooling of the direct current source 62 occurs with the heat therefrom being carried off by the salt solution flowing through the electrolysis cell 10. Means 68, in the embodiment illustrated a simple bolt 70 and nut 72, serve for mounting the direct current source 62 to the support tube 22 in the manner just discussed. Meanwhile, a line 74 connects the negative output 66 with the support tube 22, which is generally of metallic construction, whereby through conductance via the bars 20, the outer electrode 12 is electrically equivalent to the negative output 66. Thus, the outer electrode 12 is the cathode and the inner electrode 34 is the anode.

Referring particularly to FIG. 1, it will be noted that the end walls 26 and 30 include both an input fluid flow path 76 and an output fluid flow path 78, which flow paths communicate with the cell cavity 36. It will be further noted that the end walls 26 and 30 generally have respective flat bottoms 80 and 82 which serve as means for positioning the generally common axis of the electrodes 12 and 34 and of the shaft 44, generally horizontally. The input fluid flow path 76 then generally communicates with the cavity 36 adjacent a bottom 84 thereof and the output flow path 78 generally communicates with the cavity 36 adjacent a top 86 thereof. This assures that there will be a forced flow of the saline solution within the cavity 36 between the outer electrode 12 and the inner electrode 34.

By reference to FIG. 2, it will be seen that the inner electrode 34 may preferably comprise a pair of electrically insulative hemi-cylinders 88 and 90 mounted to the shaft 44 and a conductive foil 92 covering out-facing surfaces 94 and 96 of the hemi-cylinders 88 and 90 and in electrically conductive contact with the shaft 44.

In accordance with the present invention, an abrading structure 98 is provided which has an abrasive portion 100. Means 102 is provided for mounting the abrading structure 98 to a respective one of the electrodes 12 and 34. In the particular embodiment illustrated, the abrading structure 98 is mounted to the inner electrode 34 with the abrasive portion 100 in abrasive contact with a respective other of the electrodes, in the embodiment illustrated, with the outer electrode 12. Means 104 are also provided for electrically insulating the abrading structure 98 from at least one of the electrodes 12 and 34, in the embodiment illustrated from the electrode 34. As is most clearly seen from FIG. 2, the abrading structure mounting means 102, in the embodiment illustrated, comprises at least one, in the embodiment illustrated a pair, axially extending channel 106 which proceeds radially inwardly into the inner electrode 34 from the out-facing surface 38 thereof. The abrading structure insulating means 104 comprises an insulating structure 108, in the embodiment illustrated an insulating bar 110 and a pair of insulating strips 112 and 114 which together completely insulate the abrasive portion 100 from the inner electrode 34. It will be noted that this structure has particular advantages in that the abrading structure 98 can be very quickly and easily replaced if needed. It will further be noted that the abrading structure 98 preferably extends axially substantially the entire co-extensive portion of the electrodes to provide full abrasive action on the cathode. Further, assembly and disassembly requires no critical alignment.

EMBODIMENT OF FIG. 3

Figure 3:
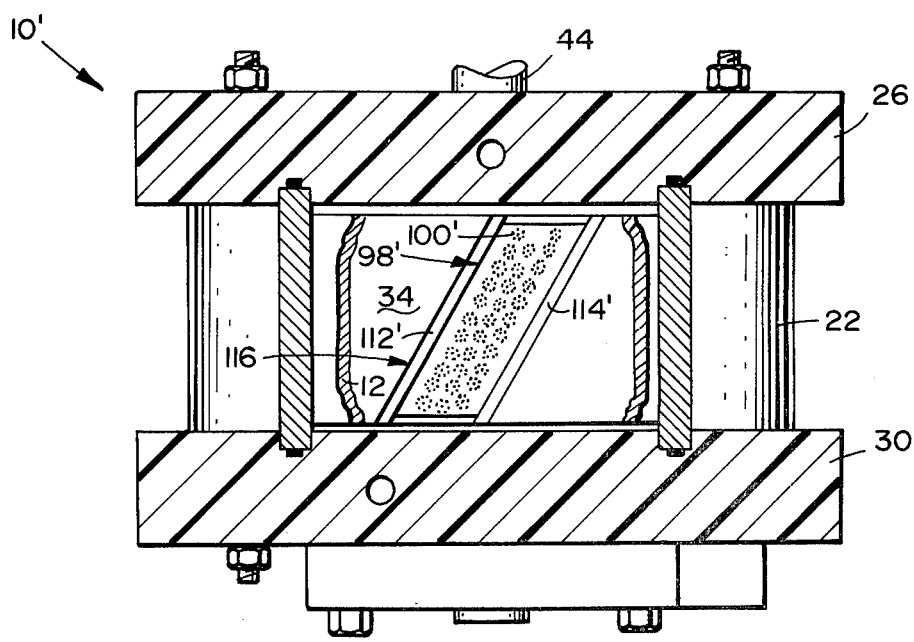
FIG. 3 illustrates a view of an alternate embodiment taken generally along a line which would correspond to the line III—III of FIG. 2.
Figure 5:
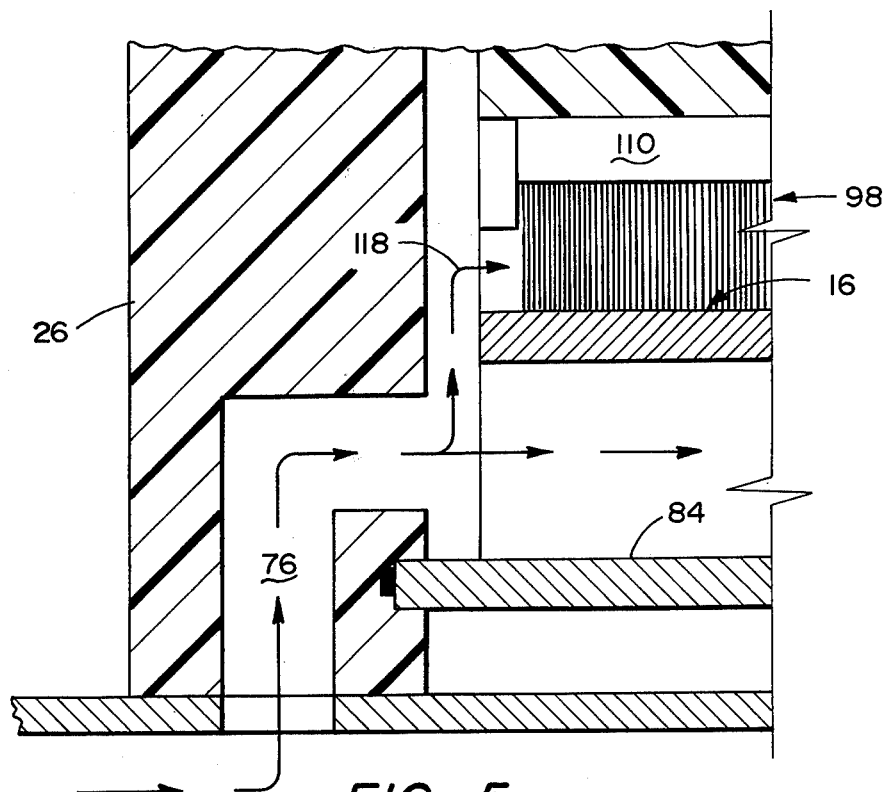
FIG. 5 illustrates in a partial enlarged view area V of FIG. 1.

Adverting now to FIG. 3 there is shown an embodiment of the present invention wherein the abrasive portion 100 of the abrading structure 98 is at an angle relative to the generally common axis of the electrodes 12 and 34 and the shaft 44. In this manner, the abrading structure 98 also serves as one type of means 116 for motivating fluid in the cavity 36 to flow axially relative to the electrodes 12 and 34 and in the space between said electrodes 12 and 34 in the direction shown by an arrow 118 in FIG. 5.

EMBODIMENT OF FIG. 4

Figure 4:
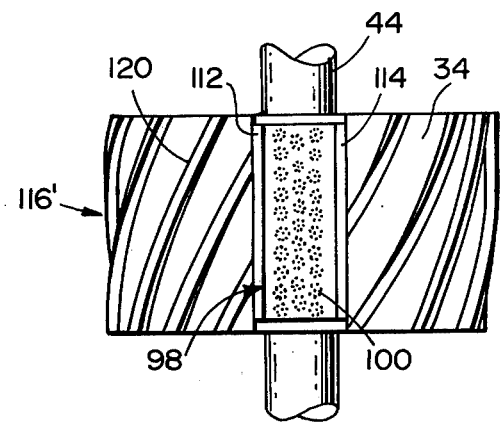
FIG. 4 illustrates in partial side view a second alternate embodiment in accordance with the present invention.

Turning now to FIG. 4, there is illustrated another embodiment of the present invention which includes an alternate means 116' for motivating fluid in the cavity 36 to flow axially relative to the electrodes 12 and 34 and in the space between said electrodes 12 and 34. In the particular embodiment illustrated in FIG. 4, the fluid motivating means comprises a plurality of flutes 120 which are at an angle relative to the generally common axis of the electrodes 12 and 34, and of the shaft 44. These flutes may be helical or simply at any desirable angle to said generally common axis. In this manner, the flutes 120 serves to propel fluid axially between the electrodes 12 and 34.

Through operating in accordance with the present invention an improved electrolysis cell is provided which is easy to assemble and disassemble and which protects against the formation of scale therein on the anode. Further, the entire facing surfaces of each of the electrodes can be utilized whereby more efficient production of chlorine can be attained. The entire apparatus is relatively simple and rugged thus making it particularly adaptable for use with swimming pools and the like.

While the invention has been described in connection with specific embodiments thereof, it will be understood that it is capable of further modification, and this application is intended to cover any variations, uses or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

That which is claimed is:

1. An electrolysis cell, comprising:
   an outer electrode having an in-facing surface which falls generally on a first cylindrical surface;
   an inner generally coaxial electrode having an out-facing surface which falls generally on a second cylindrical surface, said second cylindrical surface falling inward radially of said first cylindrical surface, said outer and inner electrodes being longitudinally co-extensive for at least a substantial portion thereof;
   means for relatively rotating said inner and outer electrodes;
   an abrading structure having an abrasive portion;
   means for mounting said abrading structure to a respective one of said electrodes and with said abrasive portion thereof in abrasive contact with a respective other of said electrodes;
   means for electrically insulating said abrasive portion from at least one of said electrodes;
   means, independent of said abrading structure and carried by either said respective one or said respective other of said electrodes, for mechanically motivating fluid in said cavity to flow axially relative to said electrodes in the space therebetween; and
   means for supporting said electrodes in electrically insulating relation relative to one another and for defining a cell cavity about said electrodes.

2. An electrolysis cell, comprising:
   an outer electrode having an in-facing surface which falls generally on a first cylindrical surface;
   an inner generally coaxial electrode having an out-facing surface which falls generally on a second cylindrical surface, said second cylindrical surface falling inward radially of said first cylindrical surface, said outer and inner electrodes being longitudinally co-extensive for at least a substantial portion thereof;
   an abrading structure having an abrasive portion;
   means for mounting said abrading structure to a respective one of said electrodes and with said abrasive portion thereof in abrasive contact with a respective other of said electrodes;
   means for electrically insulating said abrasive portion from at least one of said electrodes;
   a support tube surrounding said outer electrode and having first and second ends;
   a support structure extending from said tube into supporting contact with said outer electrodes;
   a first end wall closing said first end of said tube;
   a second end wall closing said second end of said tube;
   an electrically conductive shaft passing through a respective one of said end walls in sealing rotatable relation thereto and being connected to said inner electrode axially thereof to cause rotation thereof;
   means external of said end walls for motivating said shaft to rotate;
   means conductively connecting said shaft to said out-facing surface of said inner electrodes;
   a source of direct current having both a positive output and a negative output;
   means for electrically contacting a respective one of said outputs with said shaft;
   means for electrically connecting a respective other of said outputs with said outer electrode; and
   means for mounting said direct current source to said support tube for cooling said direct current source.

3. An electrolysis cell, comprising;
   an outer electrode having an in-facing surface which falls generally on a first cylindrical surface;
   an inner generally coaxial electrode having an out-facing surface which falls generally on a second cylindrical surface, said second cylindrical surface falling inward radially of said first cylindrical surface, said outer and inner electrodes being longitudinally co-extensive for at least a substantial portion thereof;
   an abrading structure having an abrasive portion;
   means for mounting said abrading structure to a respective one of said electrodes and with said abrasive portion thereof in abrasive contact with a respective other of said electrodes;
   means for electrically insulating said abrasive portion from at least one of said electrodes;
   a support tube surrounding said outer electrode and having first and second ends;
   a support structure extending from said tube into supporting contact with said outer electrodes;
   a first end wall closing said first end of said tube;
   a second end wall closing said second end of said tube;
   an electrically conductive shaft passing through a respective one of said end walls in sealing rotatable relation thereto and being connected to said inner electrode axially thereof to cause rotation thereof;
   means external of said walls for motivating said shaft to rotate;
   means conductively connecting said shaft to said out-facing surface of said inner electrode;
   a source of direct current having both a positive output and a negative output;
   means for electrically contacting a respective one of said outputs with said shaft; and
   means for electrically connecting a respective other of said outputs with said outer electrode; and wherein said inner electrode comprises a pair of electrically insulated hemi-cylinders mounted to said shaft and a conductive foil covering out-facing surfaces of the said hemi-cylinders and in electrically conductive contact with said shaft.

4. An electrolysis cell, comprising;
   an outer electrode having an in-facing surface which falls generally on a first cylindrical surface;
   an inner generally coaxial electrode having an out-facing surface which falls generally on a second cylindrical surface, said second cylindrical surface falling inward radially of said first cylindrical surface, said outer and inner electrodes being longitudinally co-extensive for at least a substantial portion thereof;
   means for relatively rotating said inner and outer electrodes;
   an abrading structure having an abrasive portion,
   means for mounting said abrading structure to a respective one of said electrodes and with said abrasive portion thereof in abrasive contact with a respective other of said electrodes, said abrading structure mounting means comprising at least one axially extending channel proceeding radially inwardly into said inner electrode from said out-facing surface thereof;
   means for electrically insulating said abrasive portion from at least one of said electrodes, said abrasive portion insulating means comprising an insulating structure within said channel; and means for supporting said electrodes in electrically insulating relation relative to one another and for defining a cell cavity about said electrodes.

5. An electrolysis cell, comprising:
an outer electrode having an in-facing surface which falls generally on a first cylindrical surface;
an inner generally coaxial electrode having an outfacing surface which falls generally on a second cylindrical surface, said second cylindrical surface falling inward radially of said first cylindrical surface, said outer and inner electrodes being longitudinally co-extensive for at least a substantial portion thereof;
means for relatively rotating said inner and outer electrodes;
an abrading structure having an abrasive portion;
means for mounting said abrading structure to a respective one of said electrodes and with said abrasive portion thereof in abrasive contact with a respective other of said electrodes;
means for electrically insulating said abrasive portion from at least one of said electrodes;
means for supporting said electrodes in electrically insulating relation relative to one another and for defining a cell cavity about said electrodes;
a first end wall closing a first end of said cavity;
a second end wall closing a second end of said cavity;
means for positioning said generally common axis of said electrodes generally horizontally;
an input fluid flow path communicating with said cavity adjacent a bottom thereof and adjacent said first end thereof; and
an output fluid flow path communicating with said cavity adjacent a top thereof and adjacent said second end thereof.

6. An electrolysis cell, comprising:
an outer electrode having an in-facing surface which falls generally on a first cylindrical surface;
an inner generally coaxial electrode having an outfacing surface which falls generally on a second cylindrical surface, said second cylindrical surface falling inward radially of said first cylindrical surface, said outer and inner electrodes being longitudinally co-extensive for at least a substantial portion thereof;
means for relatively rotating said inner and outer electrodes;
an abrading structure having an abrasive portion;
means for mounting said abrading structure to a respective one of said electrodes and with said abrasive portion thereof in abrasive contact with a respective other of said electrodes;
means for electrically insulating said abrasive portion from at least one of said electrodes;
means for supporting said electrodes in electrically insulating relation relative to one another and for defining a cell cavity about said electrodes;
a source of direct current having both a positive output and a negative output;
means for electrically contacting a respective one of said outputs with said outer electrode;
means for electrically connecting a respective other of said outputs with said inner electrode; and
means for mounting said direct current source to said electrode supporting and cell cavity defining means for cooling said direct current source.

7. An electrolysis cell, comprising:
an outer electrode having an in-facing surface which falls generally on a first cylindrical surface;
an inner generally coaxial electrode having an outfacing surface which falls generally on a second cylindrical surface, said second cylindrical surface falling inward radially of said first cylindrical surface, said outer and inner electrodes being longitudinally co-extensive for at least a substantial portion thereof, said inner electrode comprising a pair of electrically insulated hemi-cylinders and including a conductive foil covering outfacing surfaces of said hemi-cylinders, said foil comprising said outfacing surface of said inner generally coaxial electrode;
means for relatively rotating said inner and outer electrodes, said relatively rotating means including an electrically conductive shaft connected to said inner electrode axially thereof to cause rotation thereof, and wherein said conductive foil is in electrically conductive contact with said shaft; and
means for supporting said electrodes in electrically insulating relation relative to one another and for defining a cell cavity about said electrodes.

* * * * *